US012567800B2

(12) United States Patent
Stuler et al.

(10) Patent No.: US 12,567,800 B2
(45) Date of Patent: Mar. 3, 2026

(54) MULTI-MODE CONTROL METHOD FOR PFC SWITCHING POWER SUPPLY

(71) Applicant: SEMICONDUCTOR COMPONENTS INDUSTRIES, LLC, Scottsdale, AZ (US)

(72) Inventors: Roman Stuler, Karolinka (CZ); Vaclav Drda, Valasska Bystrice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 234 days.

(21) Appl. No.: 18/636,888

(22) Filed: Apr. 16, 2024

(65) Prior Publication Data

US 2025/0323569 A1      Oct. 16, 2025

(51) Int. Cl.
| | |
|---|---|
| H02M 1/42 | (2007.01) |
| H02M 1/00 | (2006.01) |
| H02M 1/32 | (2007.01) |
| H02M 7/219 | (2006.01) |

(52) U.S. Cl.
CPC ....... H02M 1/4233 (2013.01); H02M 1/0025 (2021.05); H02M 1/32 (2013.01); H02M 1/4225 (2013.01); H02M 7/219 (2013.01)

(58) Field of Classification Search
CPC ............ H02M 1/4208; H02M 1/0025; H02M 1/4225; H02M 1/4233; H02M 1/32; H02M 7/219; Y02B 70/10
See application file for complete search history.

(56) References Cited

U.S. PATENT DOCUMENTS

| | | | | |
|---|---|---|---|---|
| 5,450,311 | A | * | 9/1995 | Esparza Olcina .. H02M 1/4208 363/79 |
| 6,177,782 | B1 | | 1/2001 | L'Hermite et al. |
| 6,373,734 | B1 | * | 4/2002 | Martinelli .......... H02M 1/4225 323/222 |
| 7,719,248 | B1 | | 5/2010 | Melanson |
| 9,553,504 | B2 | * | 1/2017 | Wang .................. H02M 1/4258 |
| 10,581,326 | B2 | * | 3/2020 | Veeramreddi ....... H02M 3/1582 |

(Continued)

OTHER PUBLICATIONS

Texas Instruments, "UCx854 High-Power Factor Preregulator", https://www.ti.com/lit/ds/symlink/uc3854.pdf?ts=1701966751649 &ref_url=https%253A%252F%252Fwww.google.com%252F, Dec. 2016, 30 pages.

(Continued)

*Primary Examiner* — Yusef A Ahmed
(74) *Attorney, Agent, or Firm* — Dickinson Wright PLLC

(57) ABSTRACT

A PFC controller for a PFC switching power supply is disclosed. The PFC controller includes a peak controller configured to receive a feedback signal that is indicative of input power provided to a downstream power converter. The peak current controller is configured to generate a first reference current signal, while a first multiplier generates a product signal by multiplying a reference sign with the first reference current signal. A second multiplier generates a second reference current based on the product signal and a voltage error signal. A current regulator generates a current regulation signal using the second reference current and a line current. A modulator is configured to regulate the output power produced by the PFC switching power supply using the current regulation signal.

20 Claims, 8 Drawing Sheets

(56) References Cited

U.S. PATENT DOCUMENTS

| | | | | |
|---|---|---|---|---|
| 2002/0140407 | A1* | 10/2002 | Hwang | H02M 1/4225 323/207 |
| 2003/0222633 | A1* | 12/2003 | Hwang | H02M 1/36 323/282 |
| 2004/0252528 | A1* | 12/2004 | Kuwabara | H02M 1/4258 363/21.07 |
| 2005/0013143 | A1* | 1/2005 | Kim | H02M 1/4225 363/20 |
| 2006/0158912 | A1* | 7/2006 | Wu | H02M 1/4225 363/89 |
| 2006/0245219 | A1* | 11/2006 | Li | H02M 3/157 363/89 |
| 2008/0246444 | A1* | 10/2008 | Shao | H02M 1/4225 323/207 |
| 2008/0290846 | A1* | 11/2008 | Kanouda | H02M 1/4225 323/222 |
| 2008/0316779 | A1* | 12/2008 | Jayaraman | H02M 3/156 363/89 |
| 2011/0009153 | A1* | 1/2011 | Chiba | H04B 1/0475 455/127.1 |
| 2011/0109281 | A1* | 5/2011 | Yabuzaki | G05F 1/70 323/210 |
| 2011/0285301 | A1* | 11/2011 | Kuang | H05B 45/10 315/200 R |
| 2012/0014148 | A1 | 1/2012 | Li et al. | |
| 2012/0236612 | A1* | 9/2012 | Uno | H02M 1/36 363/126 |
| 2012/0281438 | A1* | 11/2012 | Fang | H02M 3/33515 363/21.12 |
| 2013/0033197 | A1* | 2/2013 | Hwang | H05B 45/382 315/307 |
| 2013/0051090 | A1* | 2/2013 | Xie | H05B 45/3725 363/21.17 |
| 2013/0077370 | A1* | 3/2013 | Gu | H02M 1/4225 363/126 |
| 2013/0223119 | A1* | 8/2013 | Zhao | H02M 1/42 363/89 |
| 2014/0097808 | A1 | 4/2014 | Clark et al. | |
| 2014/0117964 | A1* | 5/2014 | Walters | H02M 3/156 323/299 |
| 2014/0307483 | A1* | 10/2014 | Sigamani | H02M 1/4225 363/21.04 |
| 2015/0062985 | A1* | 3/2015 | Colbeck | H02M 1/4225 363/89 |
| 2015/0145485 | A1* | 5/2015 | Xie | H02M 1/4208 323/210 |
| 2016/0020692 | A1 | 1/2016 | Castelli | |
| 2016/0079888 | A1* | 3/2016 | Li | H01F 17/04 318/400.3 |
| 2016/0380528 | A1* | 12/2016 | Gao | H02M 1/15 363/21.12 |
| 2017/0170745 | A1* | 6/2017 | Wu | H02M 1/143 |
| 2019/0097532 | A1* | 3/2019 | Yamada | H02M 7/25 |
| 2021/0305907 | A1 | 9/2021 | Dong et al. | |
| 2022/0263402 | A1 | 8/2022 | Dong et al. | |
| 2023/0031930 | A1* | 2/2023 | Fu | H02J 7/02 |
| 2023/0086600 | A1 | 3/2023 | Twelkemeijer et al. | |
| 2023/0208284 | A1* | 6/2023 | Wrathall | H02M 1/4225 323/282 |
| 2024/0146185 | A1* | 5/2024 | Aharon | H02M 1/14 |

OTHER PUBLICATIONS

Semiconductor Components Industries, LLC, "High-Voltage, Multimode Power Factor Controller", NCP1618/D, Rev. 8, Jul. 2023, 31 pages.

Semiconductor Components Industries, LLC, "Power Factor Controller for Compact and Robust, Continuous Conduction Mode Pre-Converters", NCP1654/D, Rev. 7, Aug. 2021, 24 pages.

Product Data Sheet—TEA2017AAT/2 Digital Configurable LLC and Multimode PFC Controller; Sep. 18, 2023, Rev. 1.3, 65 pages.

Product Data Sheet—NCP1618 High-Voltage, Multimode Power Factor Controller; Jul. 1, 2023, Rev. 8, 31 pages.

* cited by examiner

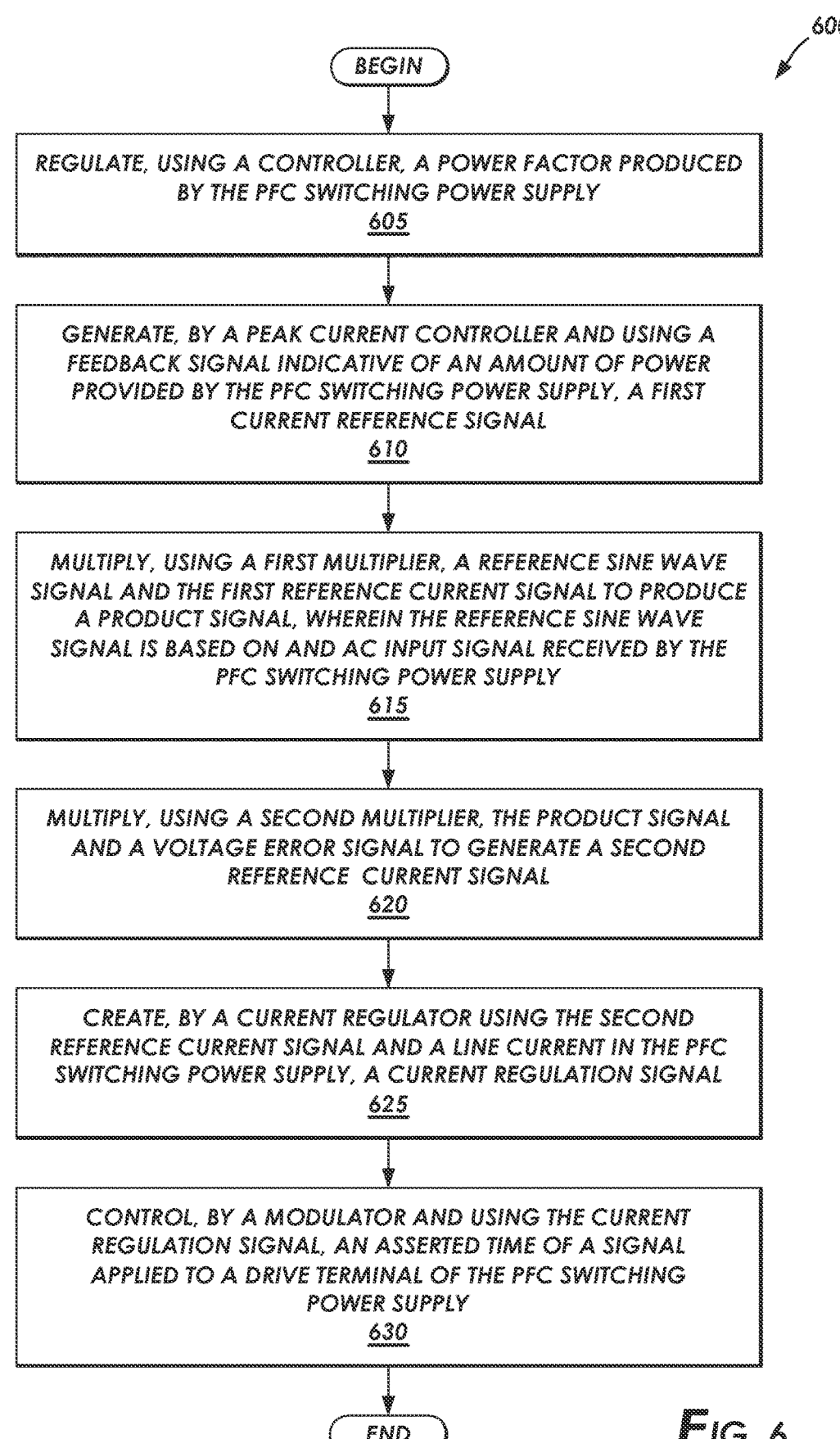

_600_

BEGIN

REGULATE, USING A CONTROLLER, A POWER FACTOR PRODUCED
BY THE PFC SWITCHING POWER SUPPLY
605

GENERATE, BY A PEAK CURRENT CONTROLLER AND USING A
FEEDBACK SIGNAL INDICATIVE OF AN AMOUNT OF POWER
PROVIDED BY THE PFC SWITCHING POWER SUPPLY, A FIRST
CURRENT REFERENCE SIGNAL
610

MULTIPLY, USING A FIRST MULTIPLIER, A REFERENCE SINE WAVE
SIGNAL AND THE FIRST REFERENCE CURRENT SIGNAL TO PRODUCE
A PRODUCT SIGNAL, WHEREIN THE REFERENCE SINE WAVE
SIGNAL IS BASED ON AND AC INPUT SIGNAL RECEIVED BY THE
PFC SWITCHING POWER SUPPLY
615

MULTIPLY, USING A SECOND MULTIPLIER, THE PRODUCT SIGNAL
AND A VOLTAGE ERROR SIGNAL TO GENERATE A SECOND
REFERENCE  CURRENT SIGNAL
620

CREATE, BY A CURRENT REGULATOR USING THE SECOND
REFERENCE CURRENT SIGNAL AND A LINE CURRENT IN THE PFC
SWITCHING POWER SUPPLY, A CURRENT REGULATION SIGNAL
625

CONTROL, BY A MODULATOR AND USING THE CURRENT
REGULATION SIGNAL, AN ASSERTED TIME OF A SIGNAL
APPLIED TO A DRIVE TERMINAL OF THE PFC SWITCHING
POWER SUPPLY
630

END

_FIG. 6_

*700*

BEGIN

OPERATE PFC CONTROLLER FOR PFC
SWITCHING POWER SUPPLY IN DIFFERENT
MODES INCLUDING DISCONTINUOUS
CURRENT MODE, CRITICAL CURRENT
MODE, AND CONTINUOUS CURRENT
MODE
<u>705</u>

MAINTAIN A SHARED CONTROL SCHEME
FOR EACH OF THE DIFFERENT MODES
<u>710</u>

END

MULTI-MODE CONTROL METHOD FOR PFC SWITCHING POWER SUPPLY

CROSS-REFERENCE TO RELATED APPLICATIONS

Not Applicable.

BACKGROUND

The present disclosure is directed to power factor correction (PFC) switching power supplies. PFC switching power supplies are used to convert AC input power into DC output power that may be used by a load circuit, such as a downstream power supply (e.g., a buck converter). A PFC switching power supply may operate such that output power may be provided at a desired power factor (the ratio between apparent power and real power absorbed by the load circuit). A PFC switching power supply may operate in different modes, depending on conditions of the load circuit. These modes may include a continuous current mode, a discontinuous current mode, and a critical current mode.

SUMMARY

A PFC controller for a PFC switching power supply is disclosed. In one embodiment, a power factor correction (PFC) controller for a PFC switching power supply includes a peak current controller configured to receive, on a feedback terminal, a feedback signal indicative of input power of a downstream power converter, wherein the peak current controller is further configured to produce a first reference current signal using the feedback signal. The PFC controller further includes a first multiplier configured generate a product signal based on a product of a reference sine wave signal and the first reference current signal, wherein the reference sine wave signal is based on an AC input signal received by the PFC switching power supply and a second multiplier configured to create a second reference current signal based on the product signal and a voltage error signal. A current regulator is configured to generate a current regulation signal using the second reference current signal and a line current of the PFC switching power supply. A modulator configured to regulate output power produced by the PFC switching power supply, wherein, to regulate the output power, the modulator is configured control an asserted time of a signal applied to a drive terminal.

In some embodiments, a control scheme used in each of a plurality of operating modes of the PFC controller is shared among the plurality of operating modes. The plurality of operating modes includes a discontinuous current mode, a critical current mode, and a continuous current mode.

In various implementations, the modulator is configured to control the asserted time of the signal applied to a drive terminal using pulse width modulation (PWM), wherein the drive terminal is coupled to a control terminal of a switch of the PFC switching power supply.

Some implementations include a reference signal generator configured to produce the reference sine wave signal using an input reference signal, wherein the reference signal generator is further configured to generate a voltage signal indicative of a root-mean-square (RMS) voltage of the AC input signal. To produce the first reference current signal, the peak current controller is configured to divide the feedback signal by the voltage signal.

Various embodiments include an error amplifier configured to generate the voltage error signal based on a reference voltage and DC sense voltage received from the PFC switching power supply. Embodiments of a PFC controller and/or PFC switching power supply are further possible and contemplated that include an over current protection unit, wherein the modulator is configured to cause the line current to be limited in response to detection of an over-current condition by the over current protection unit. A driver is implemented in some embodiments of a PFC controller, wherein the driver is configured to control activation of a switch of the PFC switching power supply based on a control signal received from the modulator.

A method for operating a power factor correction (PFC) switching power supply includes regulating, using a controller, output power produced by the PFC switching power supply. In various implementations, the regulating includes generating, by a peak current controller and using a feedback signal indicative of an amount of power drawn by a downstream load, a first reference current signal. The regulating further includes multiplying, using a first multiplier, a reference sine wave signal and the first reference current signal to produce a product signal, wherein the reference sine wave signal is based on an AC input signal received by the PFC switching power supply and multiplying, using a second multiplier, the product signal and a voltage error signal to generate a second reference current signal. The regulating also includes creating, by a current regulator using the second reference current signal and a line current in the PFC switching power supply, a current regulation signal and controlling, by a modulator and using the current regulation signal, an asserted time of a signal applied to a drive terminal of the PFC switching power supply.

Some embodiments of the method include implementing, using the controller, a control scheme that is shared among each of a plurality of operating modes. The plurality of operating modes may include any (in various combinations) or all of a discontinuous current mode, a continuous current mode, and/or a critical current mode.

In various embodiments, controlling the asserted time of a signal applied to the drive terminal of the PFC switching power supply comprises the modulator using pulse width modulation (PWM).

The method may also include generating, using a reference signal generator, the reference sine wave signal, and wherein the method further comprises generating, using the reference signal generator, a voltage signal indicative of a root-mean-square (RMS) voltage of the AC input signal. Such embodiments of the method may further include dividing, using the peak current controller, the feedback signal by the voltage signal to produce the first reference current signal.

Some embodiments of the method include producing the voltage error signal using an error amplifier, a reference voltage, and a DC sense voltage received from the PFC switching power supply.

The disclosure further contemplates a power factor correction (PFC) switching power supply. The PFC switching power supply includes a filter configured to produce a filtered AC signal by filtering an AC input signal received by the PFC switching power supply; a rectifier configured to rectify the filtered AC signal to produce a rectified signal; an inductor coupled between the rectifier and a switch node; an electrically-controlled switch having a first terminal coupled to the switch node, a second terminal coupled to a reference node, and a control terminal; and a controller having an input reference signal terminal, a feedback input terminal, and a control output terminal, wherein the controller is configured to regulate output power produced by the PFC switching power supply. The controller includes a reference signal generator configured to produce a reference sine wave signal using an input reference signal received via the input reference signal terminal, and further configured to produce, using the input reference signal, a voltage signal indicative of a root-mean-square (RMS) voltage of the AC input signal; a peak current generator configured to receive, on a feedback terminal, a feedback signal indicative of power produced by the PFC switching power supply and further configured to generate a first reference current signal by dividing the feedback signal by the voltage signal; a first multiplier configured generate a product signal based on a product of the reference sine wave signal and the first reference current signal; an error amplifier configured to output a voltage error signal based on a reference voltage and DC sense voltage indicative of a DC output voltage generated by the PFC switching power supply; a second multiplier configured to create a second reference current signal based on the product signal and the voltage error signal; a current regulator configured to generate a current regulation signal using the second reference current signal and a line current from the PFC controller; a modulator configured to produce a modulation control signal based on the second reference current signal; and a driver coupled to the control terminal, wherein the driver is configured to control an on-time of the switch based on the modulation control signal. A control scheme used in for each of a plurality of operating modes of the PFC switching power supply is shared among the plurality of operating modes. In various embodiments, the plurality of operating modes include a discontinuous current mode, a continuous current mode, and a critical current mode.

BRIEF DESCRIPTION OF THE DRAWINGS

For a detailed description of example embodiments, reference will now be made to the accompanying drawings in which:

FIG. 6 is a flow diagram illustrating a method for operating one embodiment of a PFC switching power supply.

DEFINITIONS

Figure 1:
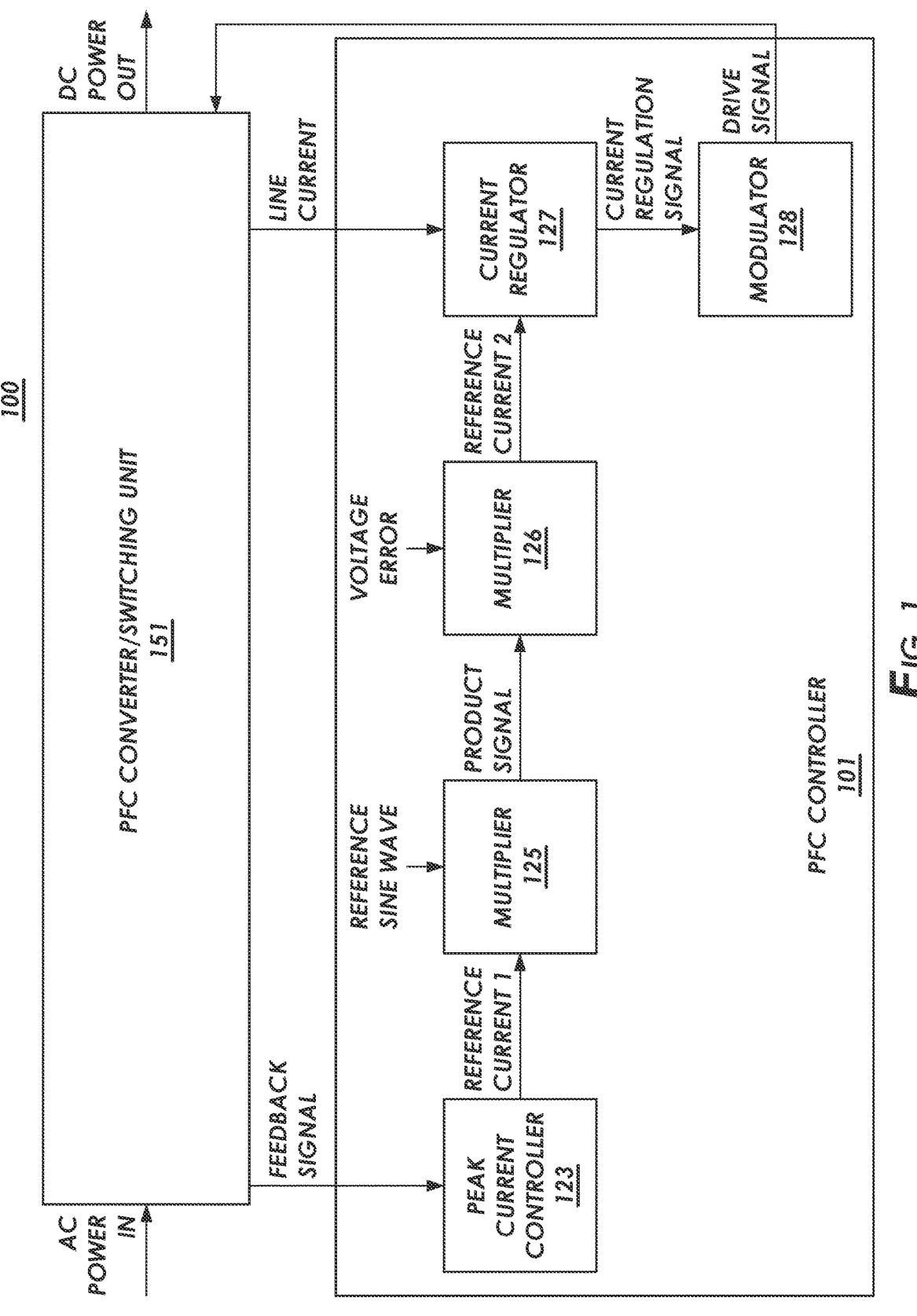
FIG. 1 is a block diagram illustrating one embodiment of a PFC switching power supply.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate the fact the recited referent may be plural.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean creating or maintaining a first predetermined state of a Boolean signal. Boolean signals may be asserted high or with a higher voltage, and Boolean signals may be asserted low or with a lower voltage, at the discretion of the circuit designer. Similarly, "de-assert" shall mean creating or maintaining a second predetermined state of the Boolean, opposite the asserted state.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

PFC controllers used for controlling PFC switching power supplies may operate in different modes. One such mode is discontinuous current mode (DCM), in which inductor current in the switching power supply falls to zero for at least a portion of a switching cycle. Another mode is continuous current mode (CCM), in which the inductor current does not fall to zero during the switching cycle. In another mode, critical current mode (CrM), the switching power converter operates near the boundary of CCM and DCM, with a switch being activated when the inductor current reaches zero. These various operating modes may be dependent on the input voltage and output power of the PFC switching power supply. PFC controllers for PFC switching power supplies utilize different control schemes for the different modes, and may also utilize, as a feedback signal, an output signal from the load circuit. Using the different control schemes can complicate transitions between the different modes. Furthermore, a feedback signal provided to the PFC controller may be taken from an output of the load circuit so as to accurately reflect power demand. A feedback signal taken from the output of the load circuit may introduce a delay in reflecting output power provided by the PFC switching power supply, thereby resulting in a phase lag that may slow transient response time. Adding compensation for the slow transient response time can introduce overshoots.

A PFC controller that utilizes the output power of the PFC switching power supply as a feedback signal may operate without significant phase lag. The present disclosure further contemplates a PFC controller that, using the feedback signal as described above, enables use of the shared (same) control scheme for the different modes of operation, such as the DCM, CrM, and CCM modes.

FIG. 1 is a block diagram illustrating one embodiment of a PFC switching power supply. In the embodiment shown, PFC switching power supply 100 includes a PFC controller 101 and a PFC converter/switching unit 151. In various implementations, PFC controller 101 may be implemented on an integrated circuit die (or multiple die), and packaged as a packaged semiconductor product. The PFC controller 101 as a packaged semiconductor product may then be combined with the individual circuit components of the PFC converter/switching unit 151 to create the overall PFC switching power supply.

PFC converter/switching unit 151 is configured to convert AC input power into DC output power. Accordingly, PFC converter/switching unit 151 includes circuitry for converting AC signals into DC signals, and may also include filters and other circuits. One possible implementation of circuitry for carrying out the functions of PFC converter/switching unit 151 is discussed in further detail below with reference to FIGS. 2A and 2B.

PFC controller 101 as shown in FIG. 1 is configured to carry out control functions for PFC switching power supply 100 such that output power from PFC converter/switching unit 151 is provided within desired specifications. PFC controller 101 is coupled to receive a feedback signal and a line current signal (indicative of the line current) from PFC converter/switching unit 151. A Drive signal generated within PFC controller 101 is used to control the operation of PFC converter/switching unit 151, e.g., through control of a switch implemented in the latter. As shown here, PFC controller 101 includes a peak current controller 123, multiplier 125, multiplier 126, a current regulator 127, and a modulator 128. These components may implement a control scheme that is shared (remains the same) across different operating modes, such as those discussed above.

Peak current controller 123 in the embodiment shown is configured to, using the feedback signal, generate a first reference current, Reference Current 1. The feedback signal provided to peak current controller 123 is indicative of an output power provided by PFC switching power supply 100 as input power to a load circuit (such as a downstream power converter). Although illustrated here as coming directly from PFC converter/switching unit 151, it is noted that the origin of the feedback signal may, in various implementations, be from the load circuit itself from a node or nodes where the power received from the PFC switching power supply 100 can be detected.

Reference Current 1, as generated by peak current controller 123, is provided to multiplier 125 along with a reference sine wave signal (Reference Sine Wave). Reference Sine Wave is used by PFC controller 101 in an effort to achieve a desired power factor, and may be generated based on the AC input signal provided to PFC converter/switching unit 151. Multiplier 125 is configured to multiply Reference Current 1 with the Reference Sine Wave to generate a product signal (Product Signal).

The Product Signal generated by multiplier 125 is received by multiplier 126, along with a voltage error signal (Voltage Error). Using these two signals, multiplier 126 is configured to generate a second product, Reference Current 2. Current regulator 127 is coupled to receive Reference Current 2, along with an indication of the line current (Line Current) from PFC converter/switching unit 151. Using Reference Current 2 and the line current indication, current regulator 127 is configured to generate a current regulation signal (Current Regulation Signal).

The generated current regulation signal is received in this example by a modulator 128, which may generate, or cause generation of, a drive signal (Drive). This signal may be used to, e.g., control a switch in PFC converter/switching unit 151 that is used to regulate the DC output power provided by PFC converter/switching unit 151. In various embodiments, modulator 128 may control the switch using pulse width modulation (PWM), in which the width of pulses are modulated by controlling an amount of time the switch is activated. Some embodiments of modulator 128 may also utilize pulse frequency modulation (PFM), in which the frequency of activations of the switch is modulated.

Figure 2A:
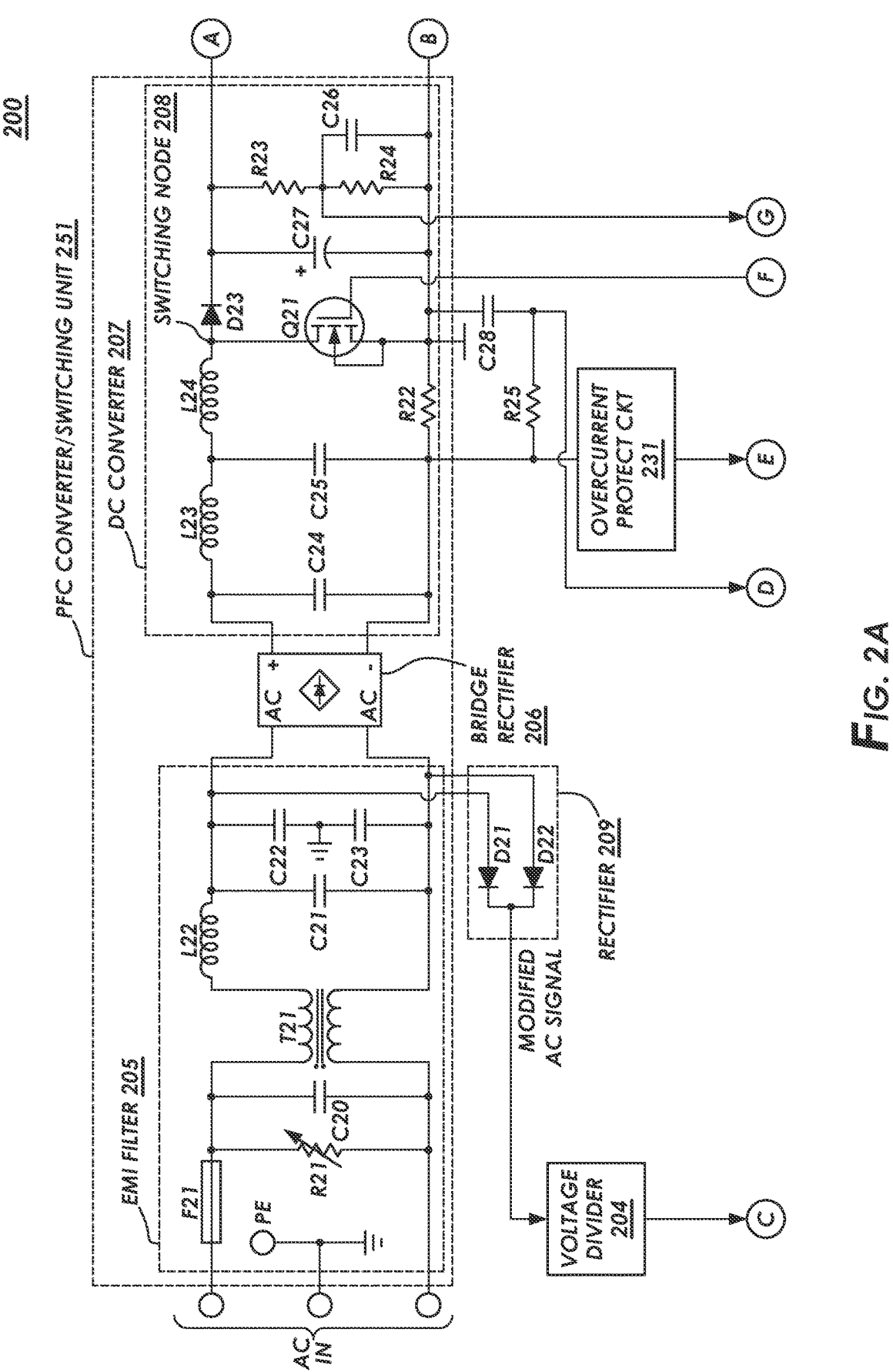
FIGS. 2A and 2B collectively illustrated a diagram of another embodiment of a PFC switching power supply.
Figure 2B:
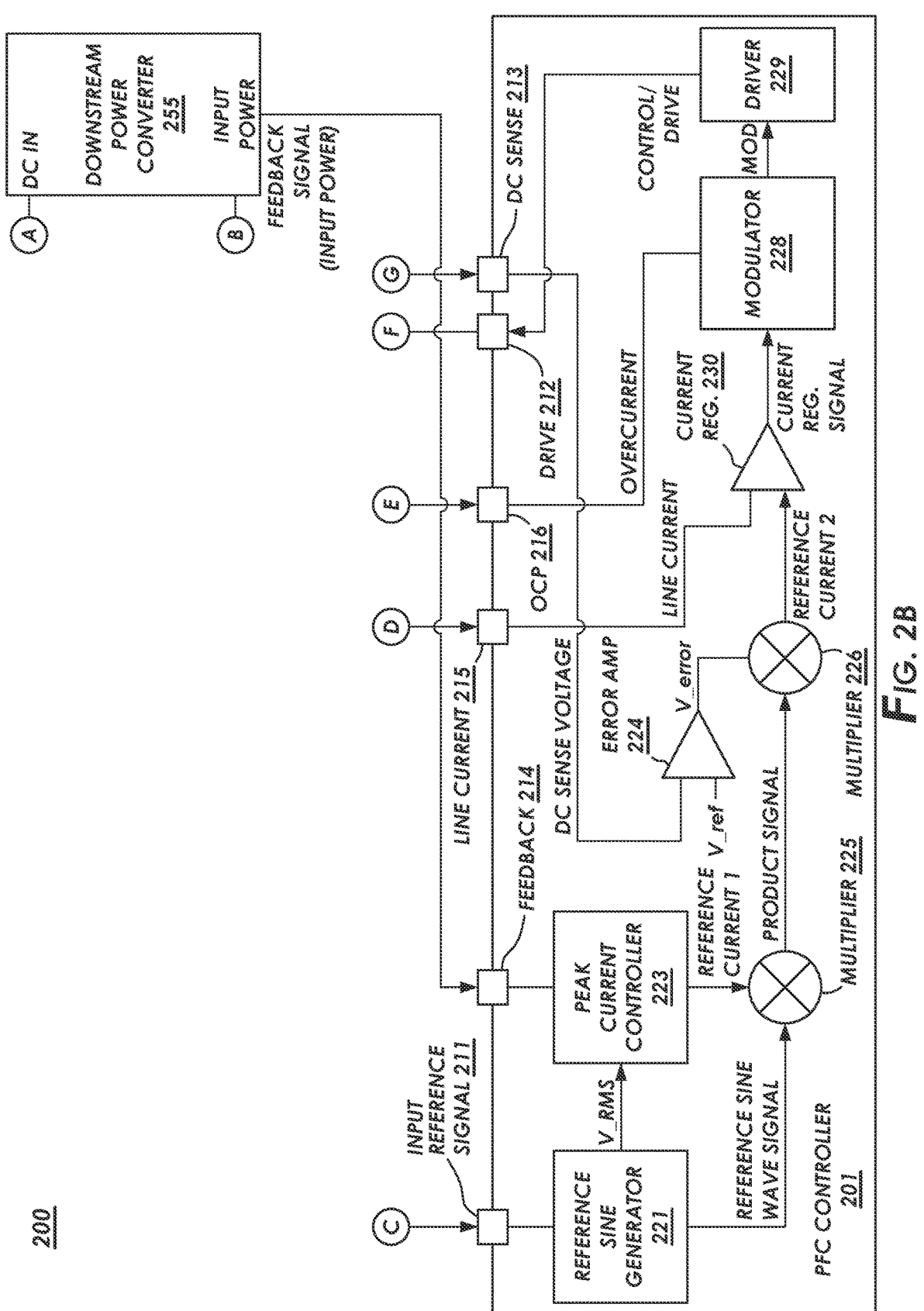

FIGS. 2A and 2B collectively show a diagram illustrating additional details of one embodiment of a PFC switching power supply. In the example of FIGS. 2A/2B, PFC switching power supply 200 includes a PFC converter/switching unit 251 and a PFC controller 201. An example load circuit in the form of downstream power converter 255 is also illustrated, although it is to be understood that this circuit is not part of PFC switching power supply 200. Similar to the example of FIG. 1, PFC controller 201 may be implemented in a package that is separate from that of PFC converter/switching unit 251, although the disclosure contemplates implementations in which a single package includes both of these units.

PFC converter/switching unit 251 as shown here is configured to convert AC input power into DC output power, and includes an EMI (electromagnetic interference) filter 205, a bridge rectifier 206, and a DC converter 207. An AC input signal may be received on the terminals of a first portion of EMI filter 205 (which includes a protective earth, or PE terminal, in this particular example, along with a fuse F21, resistor R21, and capacitor C20), passed through EMI choke T21, passed through a second portion of EMI filter 205, and rectified by bridge rectifier 206. The rectified signal output from bridge rectifier 206 is received by DC converter 207, which includes a second EMI filter comprising inductors L23 along with capacitors C24 and C25. Inductor L24, in conjunction with capacitor C27 (via diode D23) operate to alternately store and release energy to smooth out ripple in the rectified signal to produce a DC voltage. Regulation of the DC voltage, and thus the DC power provided by PFC converter/switching unit 251, is carried out in accordance with the operation of switch Q21. More particularly, the on-time of switch Q21 may be modulated in accordance with the demands of a downstream load (e.g., downstream power converter 255 in this example) coupled to PFC switching power supply 200. Switch Q21 is coupled to a switching node 208, which is formed at the junction of L24 and the anode of diode D23. The cathode of diode D23 is coupled to a DC output node upon which the output DC voltage and DC power are provided to the downstream load.

FIG. 2A also includes a voltage divider 204, a rectifier 209, and an overcurrent protection circuit 231 coupled between PFC converter/switching unit 251 and PFC controller 201. These circuits/units may, in some embodiments, be part of PFC converter/switching unit 251 and may thus be implemented in the same enclosure.

Rectifier 209 in the illustrated example is coupled to EMI filter 205, and includes diodes D21 and D22. Rectifier 209 as shown here is configured to rectify the EMI-filtered AC input signal to produce a modified AC signal. The modified AC signal is provided to voltage divider 204 for use in generating an input reference signal received by reference sine generator 221 via input reference signal terminal 211. The input reference signal is a voltage-divided version of the modified AC signal, and may provide a basis for generation of the Reference Sine Wave by reference sine generator 221.

Using the input reference signal, reference sine generator 221 may generate two output signals for use by downstream units of PFC controller 201. A first of these two output signals is the Reference Sine Wave signal, which is provided to multiplier 225. The Reference Sine Wave signal may be used by PFC controller 201 to achieve a desired power factor of the PFC switching power supply 200. Additionally, reference sine generator 221 in the embodiment shown is configured to generate a voltage signal, V_RMS, which is indicative of the RMS (root-mean-square) voltage of an AC input signal received by PFC converter/switching unit 251. The V_RMS signal is provided to peak current controller 223.

In addition to receiving the V_RMS signal, peak current controller 223 in this example is coupled to receive a Feedback Signal via feedback terminal 214. The Feedback Signal in this implementation is taken from the downstream power converter 255 coupled to PFC converter/switching unit 251. More particularly, the feedback signal is indicative of the input power received by downstream power converter 255. Using the received Feedback Signal and the V_RMS signal, peak current controller may generate a first reference current signal, Reference Current 1. In the embodiment shown, Reference Current 1 may be generated by dividing the received feedback signal by the V_RMS signal. Reference Current 1 from peak current controller 223 and the Reference Sine Wave are both received by multiplier 225, where they are multiplied to generate a product, Product Signal.

Multiplier 226 is coupled to the output of multiplier 225, as well as to the output of error amplifier 224. In the embodiment shown, error amplifier 224 is coupled to receive, on one of its inputs, a DC Sense Voltage that is received from DC converter 207 (of PFC converter/switching unit 251) via DC sense terminal 213. The DC Sense Voltage is generated on the junction of resistors R23 and R24, which form a voltage divider circuit. This voltage divider divides the voltage on the node coupled to the cathode of D23, from which a DC output voltage is conveyed. Thus, variations in the DC output voltage are reflected onto the DC Sense Voltage. Error amplifier 224 is also coupled to receive reference voltage (V_ref), and is configured to generate a voltage error signal (V_error) based on a difference between the reference voltage and the DC sense voltage. Multiplier 226 in the embodiment shown is configured to multiply the voltage error signal by the Product Signal received from multiplier 225 to generate a second reference current signal, Reference Current 2.

Current regulator 230 is coupled to receive Reference Current 2, along with an indication of the line current in PFC converter/switching unit 251. The line current indication in this example is received via the line current terminal 215, from the junction of capacitor C28 and resistors R25. Using Reference Current 2 and the line current indication, current regulator 230 may generate a current regulation signal (Current Reg Signal) that is provided to modulator 228. Modulator 228 may utilize the Current Reg Signal to generate a modulation signal (Mod) provided to driver 229, which in turn is configured to drive the gate terminal of Q21 via drive terminal 212 using the Drive signal. It is noted that embodiments in which modulator 228 and driver 229 are incorporated into a single unit are possible and contemplated.

In generating the Mod signal, and thus causing driver 229 to activate or deactivate switch Q21, modulator 228 may utilize different modulation schemes, such as PWM or PFM as discussed above. The switching of Q21 may control the exchange of energy between the inductors and capacitors of the DC converter 207 portion of PFC converter/switching unit 251.

PFC controller 201, and more particularly, modulator 228, is also coupled (via OCP terminal 216) to an overcurrent protection circuit 231. In response to detecting that a line current in PFC converter/switching unit 251 exceeds a specified limit, over current protection circuit 231 is configured to assert an overcurrent signal (Overcurrent). In response to assertion of the Overcurrent signal, modulator 228 is configured to control the modulation signal (and thus the switching of Q21) to bring the line current back to within specified limits.

It is noted that PFC controller 201 in various implementations utilizes a control scheme that does not change dependent on a mode of operation. Thus, for operation in modes such as DCM, CCM, and CrM, PFC controller 201 may utilize a control scheme that is shared among these different modes. Differences in these modes of operation may be reflected in the operation of a modulator such as modulator 228 of FIG. 2B. More particularly, modulator 228 may change certain switching parameters (e.g., pulse width) in accordance with the particular operating mode. However, the various signals and generation thereof by a PFC controller according to the present disclosure (and described with reference to FIGS. 1 and 2) may otherwise stay the same for each of the operating modes.

Figure 3:
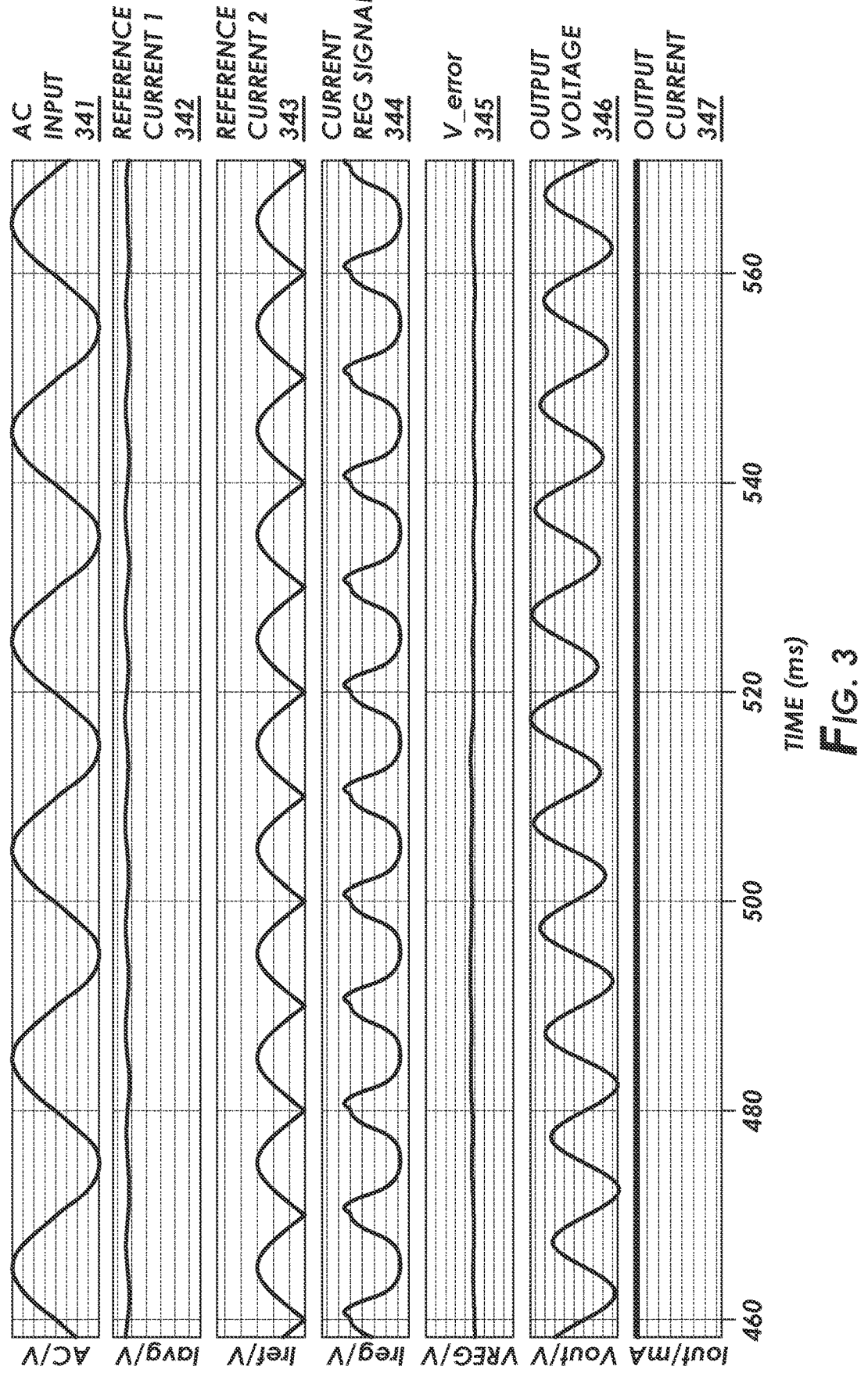
FIG. 3 is a graph illustrating the operation of one embodiment of a PFC switching power supply.

FIG. 3 is a graph illustrating the operation of one embodiment of a PFC switching power supply. The operation depicted in these graphs may be carried out by a PFC switching power supply including a PFC controller corresponding to the embodiments discussed above and variations thereof.

In this example, FIG. 3 illustrates steady state operation of an embodiment of a PFC switching power supply for a number of different signals utilized or generated in carrying out the control according to the disclosure. In the example shown in FIG. 3, the signals include: the AC input signal 341; a first reference current, Reference Current 1 342; the second reference current, Reference Current 2 343; a current regulation signal 344; an error voltage V_error 345; an output voltage 346 (a DC voltage with an AC ripple); and an output current 347. Where applicable, these signals may correspond to signals discussed above during the description of the PFC controller and corresponding control scheme (e.g., the error voltage, V_error 345 corresponds to the error voltage generate by error amplifier 224 of FIG. 2B).

Figure 4:
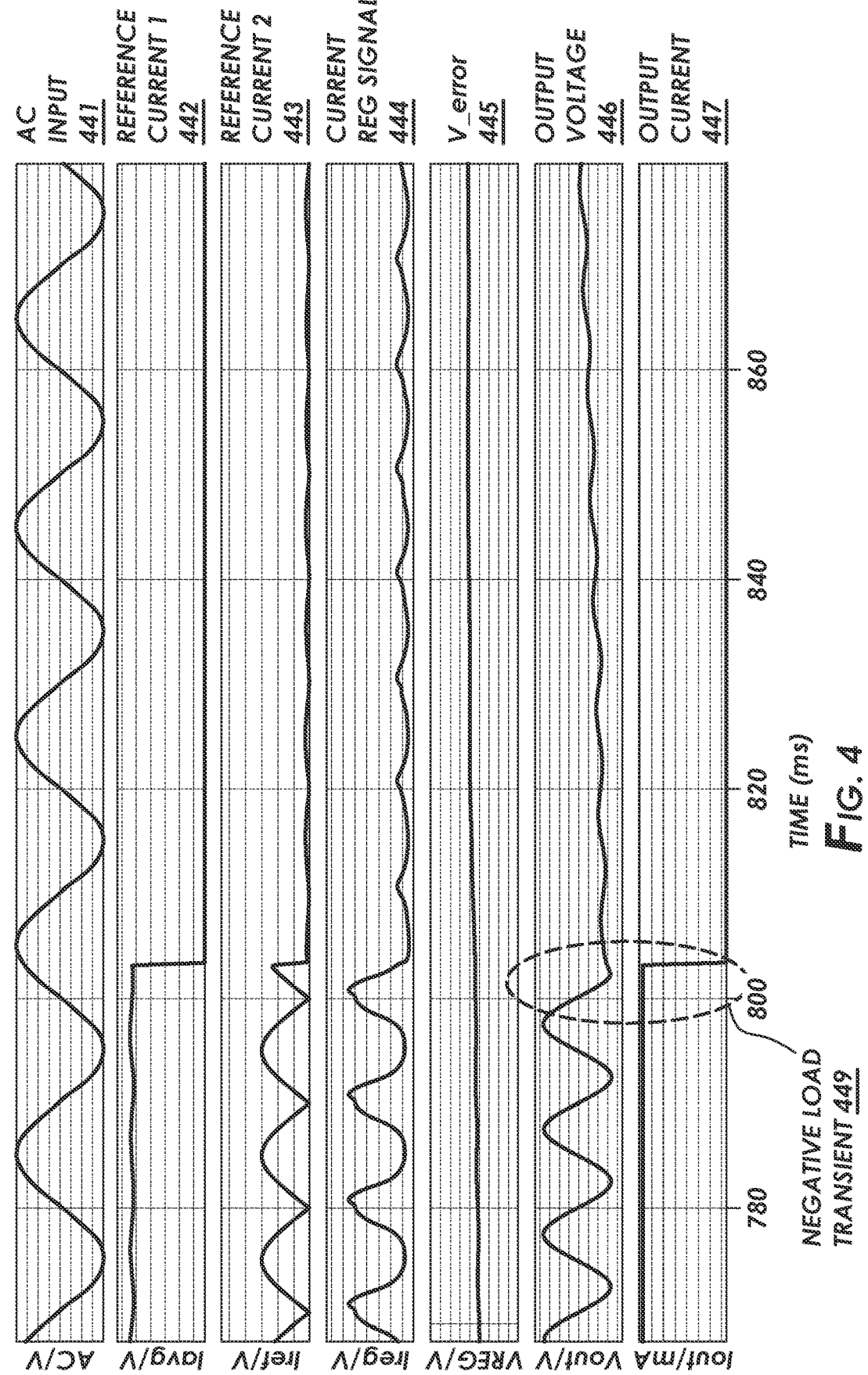
FIG. 4 is a graph further illustrating the operation of one embodiment of a PFC switching power supply.
Figure 5:
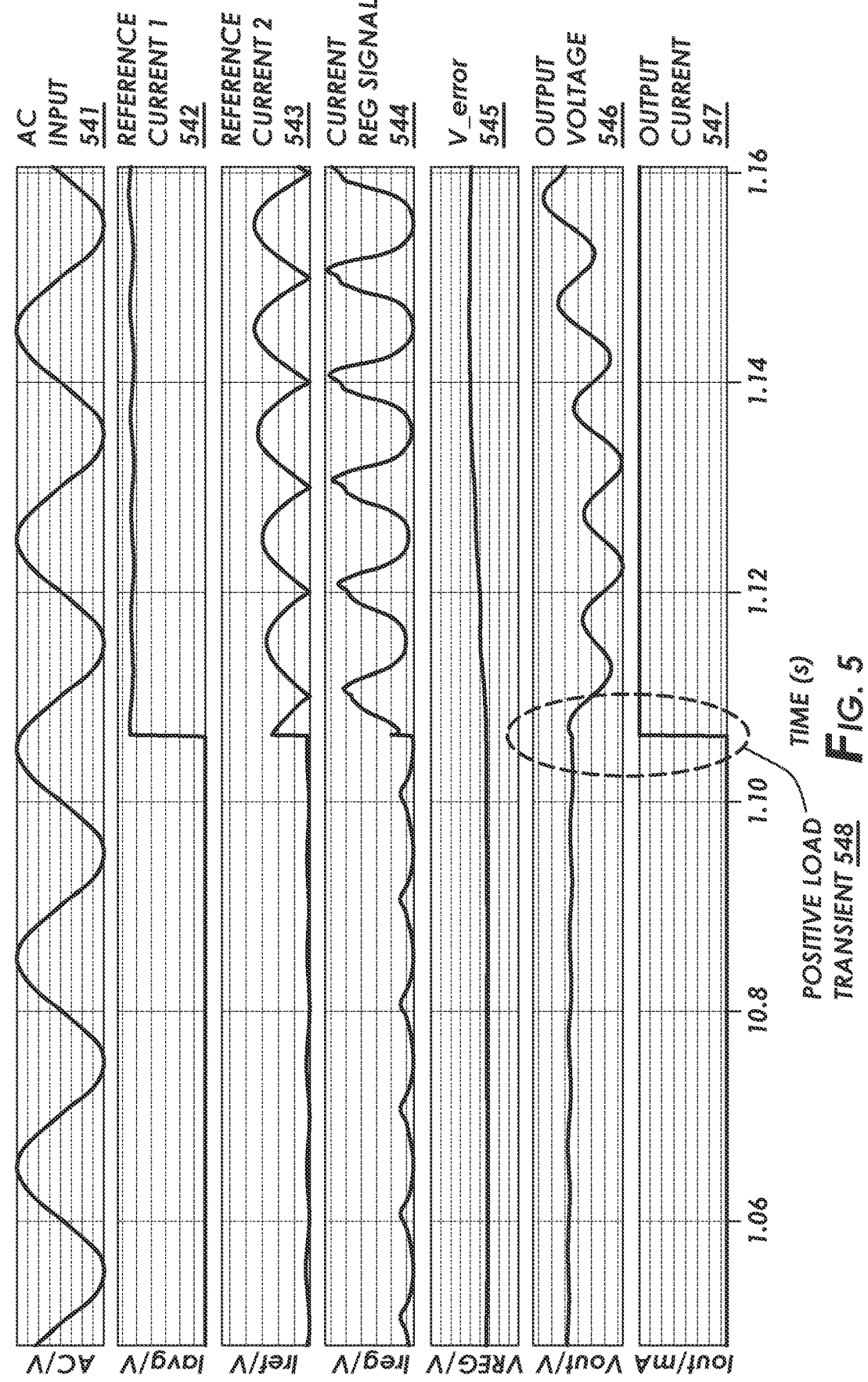
FIG. 5 is a graph further illustrating the operation of one embodiment of a PFC switching power supply.

It is additionally noted that any particular voltage, current, time, or other values shown in the graphs of FIGS. 3-5 are presented herein by way of example, and are not intended to limit the embodiments of a PFC controller or PFC switching power supply in any way. While certain signals may be representative of current values, they are nevertheless expressed as voltages in these graphs.

AC input signal 341 represents an example AC voltage that may be provided to one embodiment of a PFC switching power converter. Reference Current 1 342 in the illustrated example may be multiplied by the Reference Sine Wave (not shown; produced using a rectified version of the AC input signal as discussed above) to generate a product provided to another multiplier, with the product being multiplied by the error voltage, V_error 345, to produce Reference Current 2 343. Reference Current 2 343 is used along with a signal indicative of the line current (not shown here) to generate Current Regulation Signal 344, which may effectively be an error signal produced by an amplifier circuit such as current regulator 230 shown in FIG. 2B. The output voltage signal, Output Voltage 346, shows a relatively small voltage ripple remaining in the DC output voltage. As the graphs of FIG. 3 depict steady state operation, Output Current 347 remains relatively constant.

FIG. 4 is a graph illustrating the operation of one embodiment of a PFC switching power supply and a reaction to a negative load transient. The operation depicted in these graphs may be carried out by a PFC switching power supply including a PFC controller corresponding to the embodiments discussed above and variations thereof.

An AC input voltage 441 is shown in the top graph and corresponds to an input to the PFC switching power supply. An error voltage, V_error 445, is also depicted in the drawing. As shown in this example, the negative load transient 449 results in a drop in both Output Voltage 446 and Output Current 447. As can further be seen, Output Voltage 446 begins to recover over time without overshoot. The change to Output Voltage 446 as a result of the load transient is reflected to Reference Current 2 443 with a minimal amount of time elapsed after the load transient, indicating a fast transient response (e.g., within a few microseconds, for one embodiments, although this example value is not intended to be limiting). The fast response time in turn results in a relatively fast reflection of the load transient in Current Regulation Signal 444. The load transient is similarly reflected in the value of Reference Current 1 442.

FIG. 5 is a graph illustrating the operation of one embodiment of a PFC switching power supply and a reaction to a positive load transient. The operation depicted in these graphs may be carried out by a PFC switching power supply including a PFC controller corresponding to the embodiments discussed above and variations thereof.

An AC input voltage 541 is shown in the top graph and corresponds to an input to the PFC switching power supply. An error voltage, V_error 545, is also depicted in the drawing. The operation depicted in the graphs of FIG. 5 is similar to that of FIG. 4, but in the opposite direction. The positive load transient 548 does not result in significant drop of the Output Voltage 546, although there may be some increase in voltage ripple. Output Current 547 rises in response to positive load transient 548, as do Reference Current 1 542, Reference Current 2 543, and the Current Regulation Signal 544. The fast transient responses depicted in both FIGS. 4 and 5 may result from the control schemes discussed above in which direct input power to a down-stream load circuit (and thus, direct output power from the PFC switching power supply) is used as the feedback signal per the discussion above.

FIG. 6 is a flow diagram of a method for operating one embodiment of a PFC controller of a PFC switching power supply. Method 600 may be carried out by the various embodiments of a PFC controller as discussed elsewhere herein. Embodiments of a PFC controller capable of carrying out Method 600 but not otherwise disclosed herein are also considered to fall within the scope of this disclosure.

Method 600 includes regulating, using a controller, a power factor produced by the PFC switching power supply (block 605). The regulating includes generating, by a peak current controller and using a feedback signal indicative of an amount of power provided by the PFC switching power supply, a first reference current signal (block 610). The regulating of Method 600 further includes multiplying, using a first multiplier, a reference sine wave signal and the first reference current signal to produce a product signal, wherein the reference sine wave signal is based on an AC input signal received by the PFC switching power supply (block 615) and multiplying, using a second multiplier, the product signal and a voltage error signal to generate a second reference current signal (block 620). The regulating also includes creating, by a current regulator using the second reference current signal and a line current in the PFC switching power supply, a current regulation signal (block 625) and controlling, by a modulator and using the current regulation signal, an asserted time of a signal applied to a drive terminal of the PFC switching power supply (block 630).

In various embodiments, the method includes implementing, using the controller, a control scheme for each of a plurality of operating modes is shared among the plurality of operating modes. The plurality of operating modes in one implementation of the controller includes a discontinuous current mode. Implementations of a controller may also operate in a plurality of operating modes including a continuous current mode and/or a critical current mode.

In some implementations of a controller capable of carrying out Method 600, controlling an asserted time of a signal applied to a drive terminal of the PFC switching power supply comprises the modulator using pulse width modulation (PWM).

The method as carried out by some controllers according to the disclosure may include generating, using a reference signal generator, the reference sine wave signal, and further comprises generating, using the reference signal generator, a voltage signal indicative of a root-mean-square (RMS) voltage of the AC input signal. The method as implemented in such controllers may also include dividing, using the peak current controller, the feedback signal by the voltage signal to produce the first reference current signal.

The method as carried out in some embodiments of a controller may include producing the voltage error signal using an error amplifier, a reference voltage, and a DC sense voltage received from the PFC switching power supply.

Figure 7:
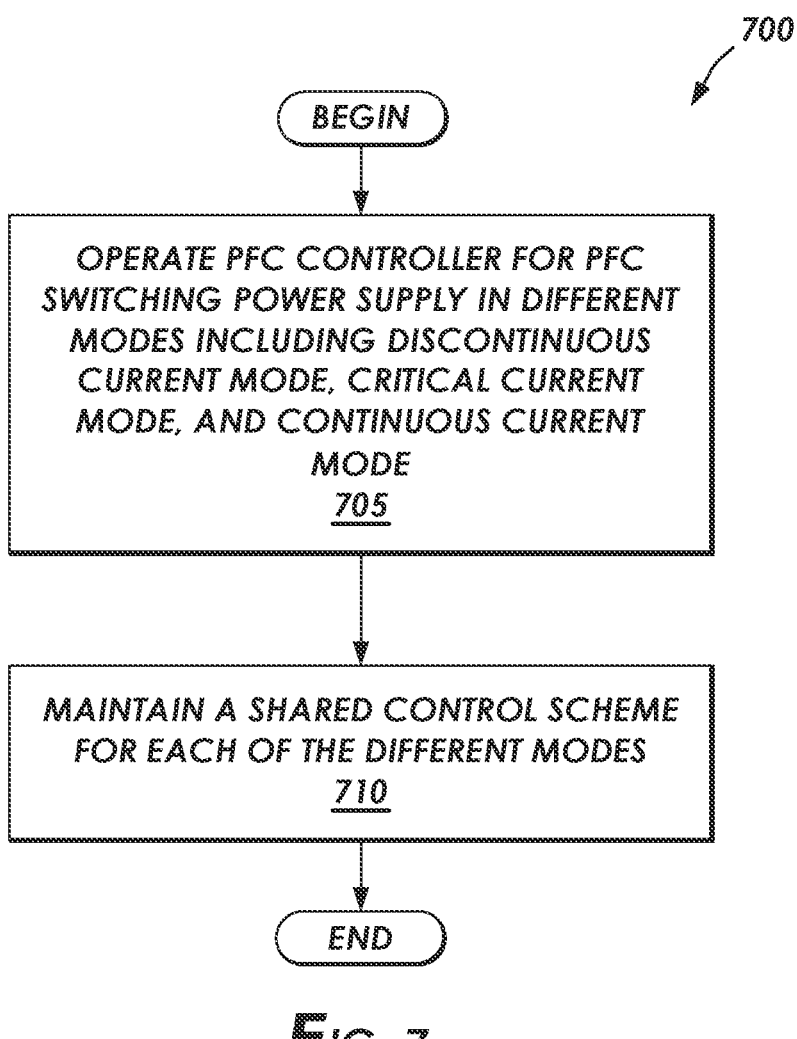
FIG. 7 is a flow diagram illustrating another method for operating one embodiment of a PFC switching power supply.

FIG. 7 is a flow diagram illustrating another method for operating one embodiment of a PFC switching power supply. Method 700 as discussed herein may be carried out by the various embodiments of a PFC switching power supply and corresponding PFC controller as discussed above. Embodiments of a PFC switching power supply and PFC controller capable of carrying out Method 700, but not explicitly discussed herein, are also considered to fall within the scope of this disclosure.

Method 700 includes operating a PFC controller for a PFC switching power supply in different modes, with the different modes including a discontinuous current mode, a critical current mode and a continuous current mode (block 705). Method 700 further includes maintaining a shared control scheme for operation in each of these different modes (block 710).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A power factor correction (PFC) controller for a PFC switching power supply, the PFC controller comprising:
a peak current controller configured to receive, on a feedback terminal, a feedback signal indicative of input power of a downstream power converter, wherein the peak current controller is further configured to produce a first reference current signal using the feedback signal;
a first multiplier configured to generate a product signal based on a product of a reference sine wave signal and the first reference current signal, wherein the reference sine wave signal is based on an AC input signal received by the PFC switching power supply;
a second multiplier configured to generate a second reference current signal based on the product signal and a voltage error signal;
a current regulator configured to generate a current regulation signal using the second reference current signal and a line current of the PFC switching power supply; and
a modulator configured to, using the current regulation signal, regulate output power produced by the PFC switching power supply, wherein, to regulate the output power, the modulator is configured to control an asserted time of a signal applied to a drive terminal.

2. The PFC controller of claim 1, wherein a control scheme used in each of a plurality of operating modes of the PFC controller is shared among the plurality of operating modes.

3. The PFC controller of claim 2, wherein the plurality of operating modes includes a discontinuous current mode, a critical current mode, and a continuous current mode.

4. The PFC controller of claim 1, wherein the modulator is configured to control the asserted time of the signal applied to the drive terminal using pulse width modulation (PWM), wherein the drive terminal is coupled to a control terminal of a switch of the PFC switching power supply.

5. The PFC controller of claim 1, further comprising a reference signal generator configured to produce the reference sine wave signal using an input reference signal, wherein the reference signal generator is further configured to generate a voltage signal indicative of a root-mean-square (RMS) voltage of the AC input signal.

6. The PFC controller of claim 5, wherein, to produce the first reference current signal, the peak current controller is configured to divide the feedback signal by the voltage signal.

7. The PFC controller of claim 1, further comprising an error amplifier configured to generate the voltage error signal based on a reference voltage and DC sense voltage received from the PFC switching power supply.

8. The PFC controller of claim 1, further comprising an over current protection unit, wherein the modulator is configured to cause the line current to be limited in response to detection of an over-current condition by the over current protection unit.

9. The PFC controller of claim 1, further comprising a driver configured to control activation of a switch of the PFC switching power supply based on a control signal received from the modulator.

10. A method for operating a power factor correction (PFC) switching power supply, the method comprising:
regulating, using a controller, output power produced by the PFC switching power supply, wherein the regulating includes:
generating, by a peak current controller and using a feedback signal indicative of an amount of power drawn by a downstream load, a first reference current signal;
multiplying, using a first multiplier, a reference sine wave signal and the first reference current signal to produce a product signal, wherein the reference sine wave signal is based on an AC input signal received by the PFC switching power supply;
multiplying, using a second multiplier, the product signal and a voltage error signal to generate a second reference current signal;
generating, by a current regulator using the second reference current signal and a line current in the PFC switching power supply, a current regulation signal; and
controlling, by a modulator and using the current regulation signal, an asserted time of a signal applied to a drive terminal of the PFC switching power supply.

11. The method of claim 10, further comprising implementing, using the controller, a control scheme that is shared among each of a plurality of operating modes.

12. The method of claim 11, wherein the plurality of operating modes includes a discontinuous current mode.

13. The method of claim 11, wherein the plurality of operating modes includes a continuous current mode.

14. The method of claim 11, wherein the plurality of operating modes includes a critical current mode.

15. The method of claim 10, wherein controlling the asserted time of the signal applied to the drive terminal of the PFC switching power supply comprises the modulator using pulse width modulation (PWM).

16. The method of claim 10, further comprising generating, using a reference signal generator, the reference sine wave signal, and wherein the method further comprises generating, using the reference signal generator, a voltage signal indicative of a root-mean-square (RMS) voltage of the AC input signal.

17. The method of claim 16, further comprising dividing, using the peak current controller, the feedback signal by the voltage signal to produce the first reference current signal.

18. The method of claim 10, further comprising producing the voltage error signal using an error amplifier, a reference voltage, and a DC sense voltage received from the PFC switching power supply.

19. A power factor correction (PFC) switching power supply comprising:
  a filter configured to produce a filtered AC signal by filtering an AC input signal received by the PFC switching power supply;
  a rectifier configured to rectify the filtered AC signal to produce a rectified signal;
  an inductor coupled between the rectifier and a switch node;
  an electrically-controlled switch having a first terminal coupled to the switch node, a second terminal coupled to a reference node, and a control terminal; and
  a PFC controller having an input reference signal terminal, a feedback input-terminal, and a control output terminal, wherein the PFC controller is configured to regulate output power produced by the PFC switching power supply, wherein the PFC controller includes:
    a reference signal generator configured to produce a reference sine wave signal using an input reference signal received via the input reference signal terminal, and further configured to produce, using the input reference signal, a voltage signal indicative of a root-mean-square (RMS) voltage of the AC input signal;
    a peak current generator configured to receive, on the feedback terminal, a feedback signal indicative of the output power produced by the PFC switching power supply, and generate a first reference current signal by dividing the feedback signal by the voltage signal;
    a first multiplier configured to generate a product signal based on a product of the reference sine wave signal and the first reference current signal;
    an error amplifier configured to output a voltage error signal based on a reference voltage and DC sense voltage indicative of a DC output voltage generated by the PFC switching power supply;
    a second multiplier configured to generate a second reference current signal based on the product signal and the voltage error signal;
    a current regulator configured to generate a current regulation signal using the second reference current signal and a line current from the PFC controller;
    a modulator configured to produce a modulation control signal based on the current regulation signal; and
    a driver coupled to the control terminal, wherein the driver is configured to control an on-time of the electrically-controlled switch based on the modulation control signal;
  wherein a control scheme used in for each of a plurality of operating modes of the PFC switching power supply is shared among the plurality of operating modes.

20. The PFC switching power supply of claim 19, wherein the plurality of operating modes include a discontinuous current mode, a continuous current mode, and a critical current mode.

* * * * *